W. F. BOAST & W. B. CONRAD.
MOTOR CYCLE HANDLE.
APPLICATION FILED OCT. 3, 1911.
1,030,866.
Patented July 2, 1912.
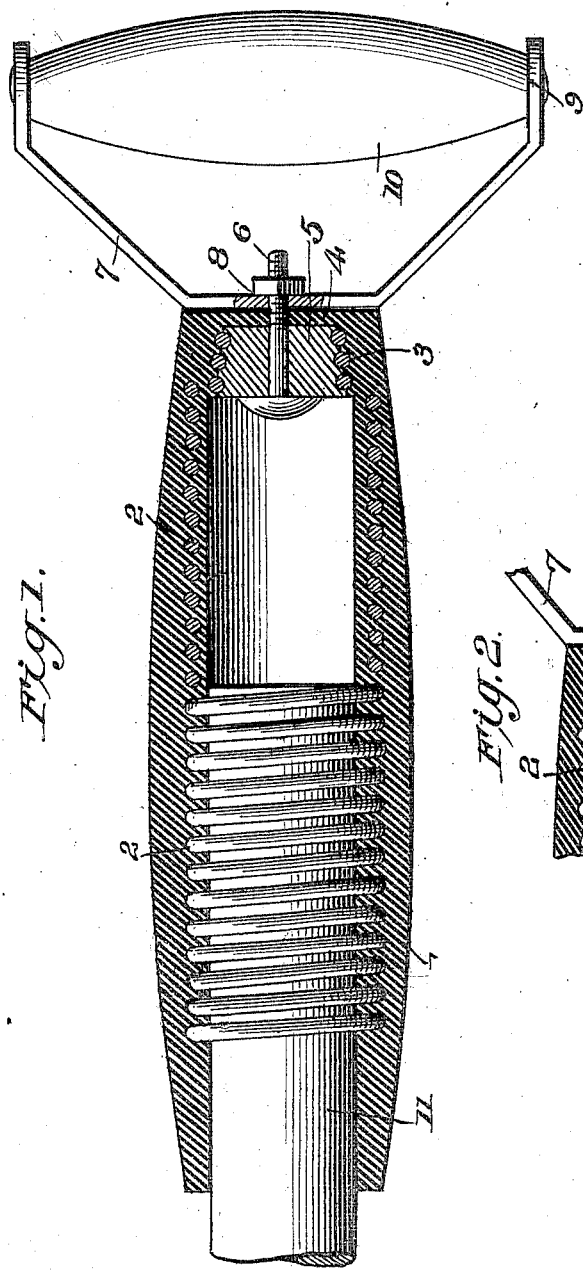
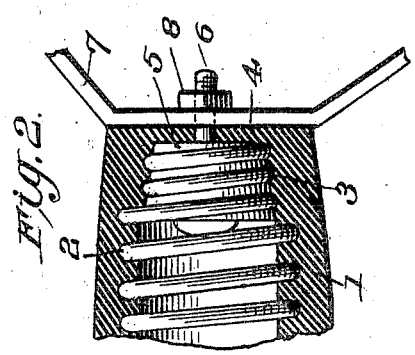
Inventor
W. F. Boast
W. B. Conrad

UNITED STATES PATENT OFFICE.

WILLIAM F. BOAST AND WILLIAM B. CONRAD, OF STERLING, COLORADO.

MOTOR-CYCLE HANDLE.

1,030,866.  Specification of Letters Patent.  Patented July 2, 1912.

Application filed October 3, 1911. Serial No. 652,606.

*To all whom it may concern:*

Be it known that we, WILLIAM F. BOAST and WILLIAM B. CONRAD, citizens of the United States, residing at Sterling, in the county of Logan and State of Colorado, have invented certain new and useful Improvements in Motor-Cycle Handles, of which the following is a specification.

This invention relates to handles for motorcycles and the like, and has for its object to provide a handle adapted to be firmly seated upon the handle bar of the machine and which possesses an ample amount of resiliency to relieve the arms of an operator from the incessant jar to which the handle bar is subjected.

With the above object in view the handle consists of a grip made of resilient material, preferably rubber, with a coiled spring inserted therein. The said grip is adapted to be positioned upon the end of the handle bar with its outer end spaced from the outer end of the bar. A second grip is provided on the outer end of the first mentioned grip and may be used for controlling the handle bar should the operator so desire.

Further objects and advantages will appear in the following description, it being understood that various changes in form, proportions, and minor details of construction may be resorted to within the scope of the appended claims.

For a full understanding of the invention reference is to be had to the following description and accompanying drawing, in which:

Figure 1 is a longitudinal sectional view of the handle; and Fig. 2 is a detail sectional view of a portion of the same.

Corresponding and like parts are referred to in the following description and indicated in all the views of the accompanying drawing by the same reference characters.

The handle consists of a grip 1 which is preferably formed from rubber or similar flexible material, and in which a coiled spring 2 is embedded. The spring 2 extends approximately the length of the grip and at its outer portion is reduced in diameter, as at 3, whereby it fits within the grip. The grip is hollow with its outer end closed as at 4. A block 5 is inserted in the grip 1 and engages the reduced portion 3 of the spring 2. A bolt 6 passes through the block 5 and the closed end 4 of the grip 1 and a bail 7 is positioned upon the outer end of the bolt 6 and is held thereon by means of a nut 8 which is screw threaded upon the outer end of the said bolt. A bar 9 connects the ends of the bail together and a grip 10 is positioned upon the bar 9 between the ends of the bail 7.

When the grip 1 is positioned upon the end of a handle bar which is indicated at 11, the outer closed end 4 of the grip 1 is spaced from the end of the handle bar 11 so that a portion of the grip 1 is approximately rigid with the handle bar, while a portion of the said grip may flex or bend with relation to the handle bar. Therefore it will be seen that an operator may grasp the grip 1 at that portion thereof which is approximately rigid upon the bar 11 and at the same time the grip 1 by reason of its resilient material will give sufficiently to prevent the arm and hand of the operator from being subjected to ordinary jarring or vibration of the handle bar. The operator may grasp the outer portion of the grip 1 which may bend or flex with relation to the bar 11 and thus the hand and arm of the operator is relieved of excessive jarring or vibration of the handle bar. If the operator so desires he may grasp the grip 10 at the outer end of the grip 1 and thus his hand is held at the end of the bar 11 and may be changed from a direction parallel with the bar 11 into a position at a right angle to the said bar. This will afford rest by reason of the change of position.

Having thus described the invention, what is claimed as new is:

1. A handle comprising a hollow grip of resilient material, a coiled spring embedded therein, a block located in the outer end of the grip, a bolt passing through the block, a bail mounted upon the bolt, a rod connecting the ends of the bail together, and a grip located upon said rod.

2. A handle comprising a hollow grip, a coiled spring embedded therein and reduced in diameter at its outer portion to fit within the inner wall of the grip, a block inserted in the grip and engaging the reduced portion of the spring, a bolt passing through the block, a bail mounted upon the bolt, a rod connecting the ends of the bail together, and a grip located upon the rod.

In testimony whereof we affix our signatures in presence of two witnesses.

WILLIAM F. BOAST. [L. S.]
WILLIAM B. CONRAD. [L. S.]

Witnesses:
FRIEL N. RENNER,
W. M. JACKSON.